US012619253B2

(12) United States Patent
Konishi

(10) Patent No.: US 12,619,253 B2
(45) Date of Patent: May 5, 2026

(54) UNMANNED VEHICLE MANAGEMENT SYSTEM AND UNMANNED VEHICLE MANAGEMENT METHOD

(71) Applicant: Mitsubishi Electric Corporation, Tokyo (JP)

(72) Inventor: Yoshiaki Konishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 84 days.

(21) Appl. No.: 18/441,847

(22) Filed: Feb. 14, 2024

(65) Prior Publication Data

US 2025/0004477 A1     Jan. 2, 2025

Related U.S. Application Data

(63) Continuation of application No. PCT/JP2022/016613, filed on Mar. 31, 2022.

(51) Int. Cl.
G05D 1/606 (2024.01)
G05D 1/69 (2024.01)
(Continued)

(52) U.S. Cl.
CPC .............. G05D 1/606 (2024.01); G05D 1/69 (2024.01); *G05D 2105/55* (2024.01); *G05D 2105/80* (2024.01); *G05D 2111/10* (2024.01)

(58) Field of Classification Search
CPC ...... G05D 1/606; G05D 1/69; G05D 2105/55; G05D 2105/80; G05D 2111/10;
(Continued)

(56) References Cited

U.S. PATENT DOCUMENTS

2020/0320886 A1    10/2020   Zhou
2020/0346751 A1*   11/2020   Horelik ................... B64U 10/13

FOREIGN PATENT DOCUMENTS

CN          107613034      *   1/2018
CN          112598318      *   4/2021
(Continued)

OTHER PUBLICATIONS

Extended European Search Report for European Application No. 22935441.0, dated Sep. 10, 2024.
(Continued)

*Primary Examiner* — Muhammad Shafi
(74) *Attorney, Agent, or Firm* — Birch, Stewart, Kolasch & Birch, LLP

(57) ABSTRACT

An unmanned vehicle management system according to an aspect includes: a collection unit configured to collect video data acquired by an unmanned vehicle and natural disaster data related to natural disasters from information sources; a storage unit configured to store the video data and the natural disaster data; an analysis unit configured to extract feature amounts of the video data and the natural disaster data, and predict a high-risk area where a risk of natural disaster occurrence is higher than in other areas; a prediction unit configured to compare the video data and the natural disaster data collected during a disaster with the video data and the natural disaster data collected during normal times, and predict a disaster occurrence area where a disaster will occur; and a deployment unit configured to determine deployment of the unmanned vehicle and a rescuer based on the high-risk area and the disaster occurrence area.

17 Claims, 9 Drawing Sheets

(51) Int. Cl.

| | |
|---|---|
| *G05D 105/55* | (2024.01) |
| *G05D 105/80* | (2024.01) |
| *G05D 111/10* | (2024.01) |

(58) Field of Classification Search

CPC .... G06Q 10/04; G06Q 10/0635; G06Q 50/02; G06Q 50/06; G06Q 50/40; G06Q 50/26; B64U 2201/10; B64U 2101/30; B64U 2101/55; G06V 10/803; G06V 10/95; G06V 20/17; G06V 20/41; G06V 20/46; G06V 20/56; G06V 20/52; G08B 27/001; G08B 7/066; G08B 21/10; G08B 31/00

USPC .......................................................... 701/23

See application file for complete search history.

(56) References Cited

FOREIGN PATENT DOCUMENTS

| | | | | |
|---|---|---|---|---|
| JP | 2013-134663 | A | | 7/2013 |
| JP | 2019-115012 | A | | 7/2019 |
| JP | 2021-64878 | A | | 4/2021 |
| KR | 20130044740 | | * | 5/2013 |
| KR | 10-2017-0101519 | A | | 9/2017 |
| KR | 20170101519 | | * | 9/2017 |
| KR | 10-2161917 | B1 | | 10/2020 |
| KR | 102161917 | | * | 10/2020 |
| WO | WO-2018-064267 | | * | 4/2018 |

OTHER PUBLICATIONS

International Search Report for PCT/JP2022/016613 mailed on Jun. 14, 2022.
European Communication pursuant to Article 94(3) EPC for European Application No. 22 935 441.0, dated May 28, 2025.

* cited by examiner

FIG. 2

| LOCATION INFORMATION | DATA TYPE | FEATURE AMOUNT | DISASTER RISK | RESIDENT | DEPLOYMENT DURING NORMAL TIME | DEPLOYMENT DURING DISASTER | RESCUER |
|---|---|---|---|---|---|---|---|
| P1 (RESIDENTIAL AREA) | MOISTURE AMOUNT | F11 | R1 | PRESENT | FOR RESIDENT CONFIRMATION | FOR MONITORING | |
| | SLOPE | F12 | | | | FOR RESCUER | DEPLOYMENT |
| | WEATHER, OTHERS | F13 | | | | FOR DISASTER VICTIM | |
| P2 (EVACUATION ROUTE) | MOISTURE AMOUNT | F21 | R2 | ABSENT | FOR INFRASTRUCTURE INSPECTION | FOR MONITORING | |
| | SLOPE | F22 | | | | | |
| | WEATHER, OTHERS | F23 | | | | FOR RESCUER | DEPLOYMENT |
| P3 (RIVER) | WATER LEVEL | F31 | R3 | ABSENT | FOR INFRASTRUCTURE INSPECTION | FOR MONITORING | UNNECESSARY |
| | WEATHER | F32 | | | | | |
| | OTHERS | F33 | | | | | |
| Pn (SLOPE) | MOISTURE AMOUNT | Fn1 | Rn | ABSENT | FOR INFRASTRUCTURE INSPECTION | FOR MONITORING | UNNECESSARY |
| | SLOPE | Fn2 | | | | | |
| | WEATHER, OTHERS | Fn3 | | | | | |
| ... | ... | ... | ... | ... | ... | ... | ... |

FIG. 6

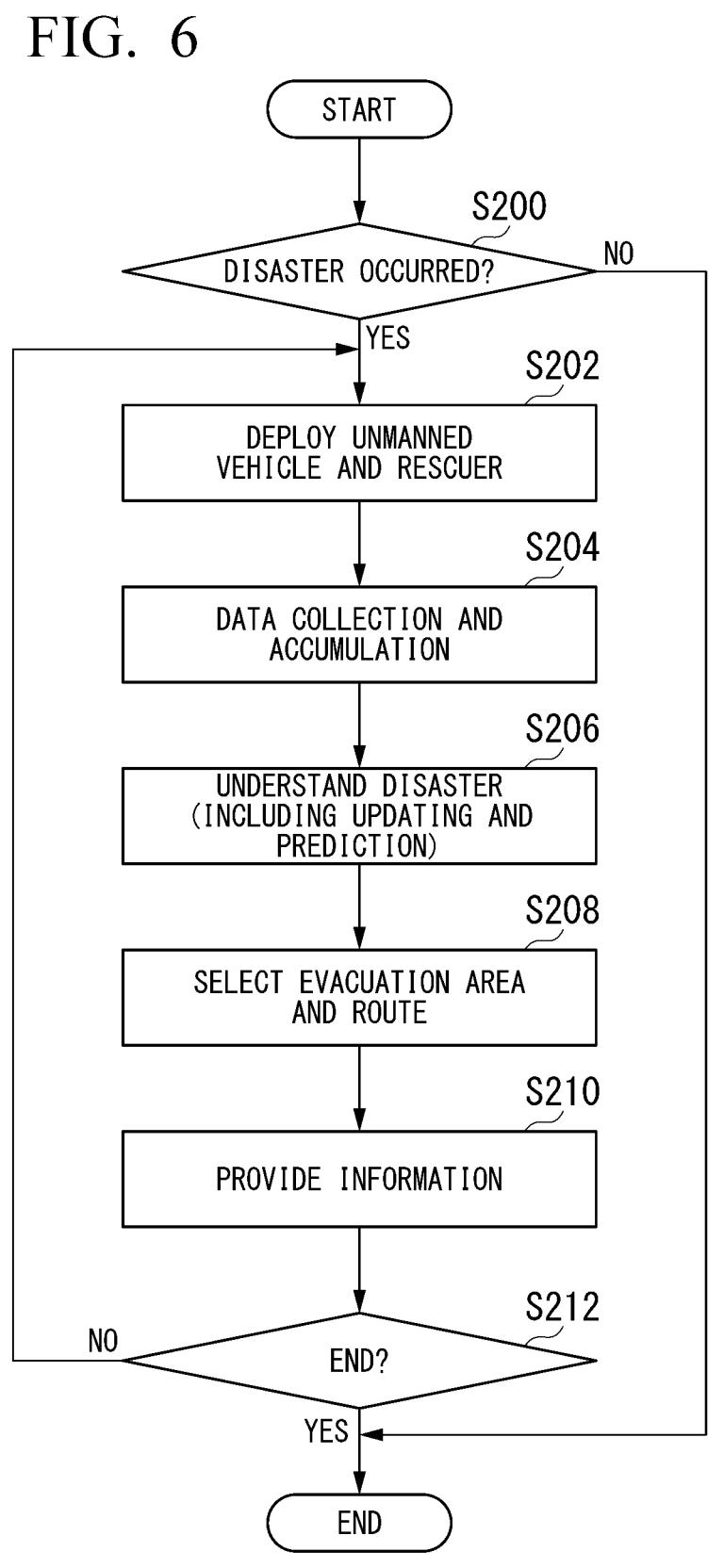

```
        ┌─────────┐
        │  START  │
        └─────────┘
             │
             ▼                    S200
        ◇─────────────────────◇         NO
        < DISASTER OCCURRED? >───────────┐
        ◇─────────────────────◇          │
             │ YES                        │
             ▼                    S202    │
    ┌───────────────────────┐             │
    │   DEPLOY UNMANNED      │             │
    │  VEHICLE AND RESCUER   │             │
    └───────────────────────┘             │
             │                    S204     │
             ▼                             │
    ┌───────────────────────┐             │
    │  DATA COLLECTION AND   │             │
    │     ACCUMULATION       │             │
    └───────────────────────┘             │
             │                    S206     │
             ▼                             │
    ┌───────────────────────┐             │
    │  UNDERSTAND DISASTER   │             │
    │ (INCLUDING UPDATING AND│             │
    │      PREDICTION)       │             │
    └───────────────────────┘             │
             │                    S208     │
             ▼                             │
    ┌───────────────────────┐             │
    │ SELECT EVACUATION AREA │             │
    │      AND ROUTE         │             │
    └───────────────────────┘             │
             │                    S210     │
             ▼                             │
    ┌───────────────────────┐             │
    │   PROVIDE INFORMATION  │             │
    └───────────────────────┘             │
             │                    S212     │
             ▼                             │
   NO   ◇─────────────────────◇           │
   ┌────< END? >                           │
   │    ◇─────────────────────◇           │
   │         │ YES                         │
   │         ▼◄───────────────────────────┘
   │    ┌─────────┐
   │    │   END   │
   │    └─────────┘
   └─── (back to YES path)
```

UNMANNED VEHICLE MANAGEMENT SYSTEM AND UNMANNED VEHICLE MANAGEMENT METHOD

This application is a U.S. continuation application of International Application No. PCT/JP2022/016613, filed on Mar. 31, 2022, the contents of which are incorporated herein by reference.

TECHNICAL FIELD

The present disclosure relates to an unmanned vehicle management system and an unmanned vehicle management method.

BACKGROUND ART

Conventionally, techniques for using unmanned vehicles for the purpose of understanding disaster situations, for example, have been known. For example, a disaster activity support system described in Patent Document 1 supports disaster activities using mobile objects by communicating information with a terminal mounted on a mobile object that moves to a site and performs disaster activities when a disaster occurs. The disaster activity support system collects from the terminal local information acquired by the mobile object, calculates an activity point of the mobile object and a travel route from the current location to the activity point, based on the local information and map information, and transmits a result of the calculation to the terminal as instruction information. A system described in Patent Document 2 is a system for inspecting water facilities that are difficult for workers to reach, and the system transmits an operation control signal generated by a control device to a drone and displays data acquired by the drone. An information processing device described in Patent Document 3 combines a plurality of first captured images captured by a plurality of flying objects, and controls the flight of the plurality of flying objects based on an operation for changing a first image range that is the image range of the composite image.

PRIOR ART DOCUMENTS

Patent Documents

[Patent Document 1] Japanese Patent Application Publication No. 2013-134663
[Patent Document 2] Japanese Patent Application Publication No. 2021-64878
[Patent Document 3] Japanese Patent Application Publication No. 2019-115012

SUMMARY OF THE INVENTION

Problems to be Solved by the Invention

In order to avoid or reduce disasters during natural disasters, for example, it is necessary to appropriately deploy unmanned vehicles and rescuers in areas with high disaster risk. However, Patent Documents 1 to 3 do not describe appropriate deployment of unmanned vehicles and rescuers.

The present disclosure has been made to solve the above-described problems, and has an object to provide an unmanned vehicle management system, an unmanned vehicle management method, a data storage device, a data analysis device, a disaster prediction device, an unmanned vehicle control device, and an information provision device, which can appropriately deploy unmanned vehicles and rescuers during a disaster.

Means for Solving the Problems

An unmanned vehicle management system according to a first aspect includes: a collection unit configured to collect video data acquired by an unmanned vehicle and natural disaster data related to natural disasters from information sources; a storage unit configured to store the video data and the natural disaster data collected by the collection unit; an analysis unit configured to extract feature amounts of the video data and the natural disaster data collected by the collection unit, and predict a high-risk area where a risk of natural disaster occurrence is higher than in other areas; a prediction unit configured to compare the video data and the natural disaster data collected during a disaster with the video data and the natural disaster data collected during normal times, and predict a disaster occurrence area where a disaster will occur; and a deployment unit configured to determine deployment of the unmanned vehicle and a rescuer based on the high-risk area and the disaster occurrence area.

An unmanned vehicle management method according to a second aspect includes: a step of collecting video data acquired by an unmanned vehicle and natural disaster data related to natural disasters from information sources; a step of storing the video data and the natural disaster data; a step of extracting feature amounts of the video data and the natural disaster data, and predicting a high-risk area where a risk of natural disaster occurrence is higher than in other areas; a step of comparing the video data and the natural disaster data collected during a disaster with the video data and the natural disaster data collected during normal times, and predicting a disaster occurrence area where a disaster will occur; and a step of determining deployment of the unmanned vehicle and a rescuer based on the high-risk area and the disaster occurrence area.

A data storage device according to a third aspect is a data storage device in an unmanned vehicle management system. The unmanned vehicle management system includes: a collection unit configured to collect video data acquired by an unmanned vehicle and natural disaster data related to natural disasters from information sources; an analysis unit configured to extract feature amounts of the video data and the natural disaster data collected by the collection unit, and predict a high-risk area where a risk of natural disaster occurrence is higher than in other areas; a prediction unit configured to compare the video data and the natural disaster data collected during a disaster with the video data and the natural disaster data collected during normal times, and predict a disaster occurrence area where a disaster will occur; and a deployment unit configured to determine deployment of the unmanned vehicle and a rescuer based on the high-risk area and the disaster occurrence area. The data storage device is configured to store the video data and the natural disaster data collected by the collection unit.

A data analysis device according to a fourth aspect is a data analysis device in an unmanned vehicle management system. The unmanned vehicle management system includes: a collection unit configured to collect video data acquired by an unmanned vehicle and natural disaster data related to natural disasters from information sources; a storage unit configured to store the video data and the natural disaster data collected by the collection unit; a prediction unit configured to compare the video data and the natural disaster data collected during a disaster with the video data and the natural disaster data collected during normal times, and predict a disaster occurrence area where a disaster will occur; and a deployment unit configured to determine deployment of the unmanned vehicle and a rescuer based on a high-risk area and the disaster occurrence area. The data analysis device is configured to extract feature amounts of the video data and the natural disaster data collected by the collection unit, and predict the high-risk area where a risk of natural disaster occurrence is higher than in other areas.

A disaster prediction device according to a fifth aspect is a disaster prediction device in an unmanned vehicle management system. The unmanned vehicle management system includes: a collection unit configured to collect video data acquired by an unmanned vehicle and natural disaster data related to natural disasters from information sources; a storage unit configured to store the video data and the natural disaster data collected by the collection unit; an analysis unit configured to extract feature amounts of the video data and the natural disaster data collected by the collection unit, and predict a high-risk area where a risk of natural disaster occurrence is higher than in other areas; and a deployment unit configured to determine deployment of the unmanned vehicle and a rescuer based on the high-risk area and a disaster occurrence area. The disaster prediction device is configured to compare the video data and the natural disaster data collected during a disaster with the video data and the natural disaster data collected during normal times, and predict the disaster occurrence area where a disaster will occur.

An unmanned vehicle control device according to a sixth aspect is an unmanned vehicle control device in an unmanned vehicle management system. The unmanned vehicle management system includes: a collection unit configured to collect video data acquired by an unmanned vehicle and natural disaster data related to natural disasters from information sources; a storage unit configured to store the video data and the natural disaster data collected by the collection unit; an analysis unit configured to extract feature amounts of the video data and the natural disaster data collected by the collection unit, and predict a high-risk area where a risk of natural disaster occurrence is higher than in other areas; and a prediction unit configured to compare the video data and the natural disaster data collected during a disaster with the video data and the natural disaster data collected during normal times, and predict a disaster occurrence area where a disaster will occur. The unmanned vehicle control device includes: a deployment unit configured to determine deployment of the unmanned vehicle and a rescuer based on the high-risk area and the disaster occurrence area; and a control unit configured to control the unmanned vehicle based on the deployment of the unmanned vehicle determined by the deployment unit.

An information provision device according to a seventh aspect is an information provision device in an unmanned vehicle management system. The unmanned vehicle management system includes: a collection unit configured to collect video data acquired by an unmanned vehicle and natural disaster data related to natural disasters from information sources; a storage unit configured to store the video data and the natural disaster data collected by the collection unit; an analysis unit configured to extract feature amounts of the video data and the natural disaster data collected by the collection unit, and predict a high-risk area where a risk of natural disaster occurrence is higher than in other areas; a prediction unit configured to compare the video data and the natural disaster data collected during a disaster with the video data and the natural disaster data collected during normal times, and predict a disaster occurrence area where a disaster will occur; and a deployment unit configured to determine deployment of the unmanned vehicle and a rescuer based on the high-risk area and the disaster occurrence area. The information provision device is configured to, based on a direction in which the rescuer is looking, switch information based on video data acquired by a first unmanned vehicle deployed in an area where the rescuer has been deployed, information based on video data acquired by a second unmanned vehicle deployed on an evacuation route from the area where the rescuer has been deployed to an evacuation site, and information based on video data acquired by a third unmanned vehicle deployed in an area where a secondary disaster is expected to occur around the area where the rescuer has been deployed, and superimpose the switched information onto a video or scenery on an information presentation unit configured to be worn by the rescuer.

Effects of the Invention

According to the present disclosure, it is possible to appropriately deploy unmanned vehicles and rescuers during a disaster.

BRIEF DESCRIPTION OF THE DRAWINGS

FIG. 2 is a diagram showing an example of an analysis database.

FIG. 6 is a flowchart showing an example of an operation during a disaster in the unmanned vehicle management system according to the embodiment.

MODE FOR CARRYING OUT THE INVENTION

Hereinafter, embodiments of the present disclosure will be described with reference to the drawings. Note that the scope of the present disclosure is not limited to the following embodiments, and can be arbitrarily modified within the scope of the technical idea of the present disclosure. Further, in the following drawings, in order to make each configuration easier to understand, the scale and number of each structure may be different from the scale and number of the actual structure.

Configuration of Unmanned Vehicle Management System

Figure 1:
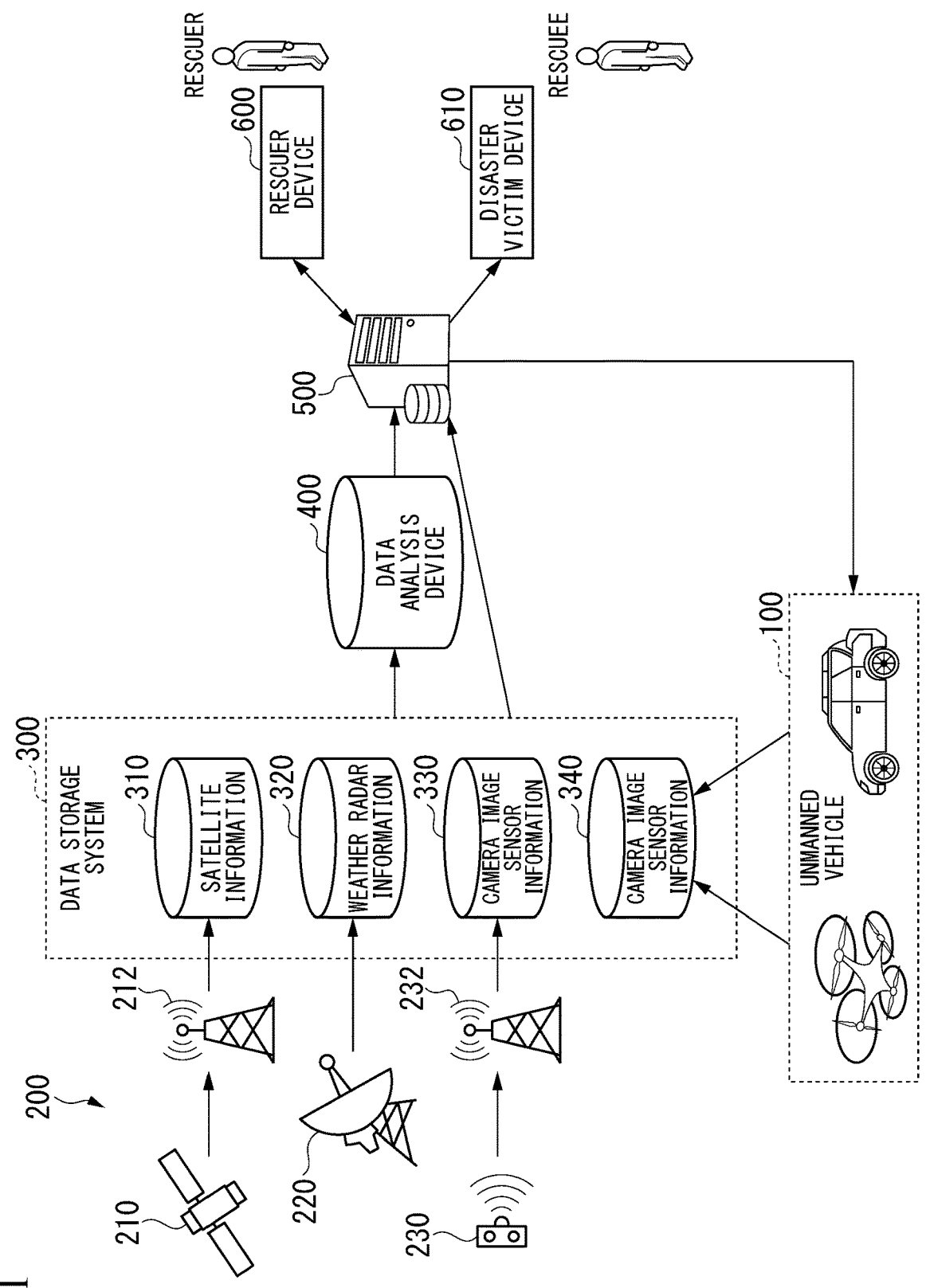
FIG. 1 is a block diagram showing an example of an unmanned vehicle management system according to an embodiment.

FIG. 1 is a block diagram illustrating an example of an unmanned vehicle management system according to an embodiment. The unmanned vehicle management system includes, for example, a plurality of unmanned vehicles 100, a data collection system 200, a data storage system 300, a data analysis device 400, a disaster prediction device 500, a rescuer device 600, and a disaster victim device 610. Each device included in the unmanned vehicle management system has a communication interface (not shown) such as a NIC (Network Interface Card) or a wireless communication module for connecting to a network NW such as the Internet.

The unmanned vehicle 100 is, for example, a drone that flies over a monitored area or an unmanned self-driving vehicle that travels on the ground. The unmanned vehicle 100 includes, for example, a camera device and a sensor. The unmanned vehicle 100 transmits to the data storage system 300, video data captured by the camera device and signals detected by the sensor. Thereby, the unmanned vehicle 100 functions as part of the data collection system 200.

The data collection system 200 includes a plurality of information sources. The data collection system 200 is a collection unit that collects, based on information sources, natural disaster data related to natural disasters and residential area data regarding residential areas where residents are present. The natural disaster data is data for understanding natural disasters such as floods, volcanic eruptions, earthquakes/tsunamis, oil spills, sea ice, and landslides, and data for predicting natural disasters. The residential area data is data regarding areas where residents are present in the monitored area.

The plurality of information sources include, for example, the unmanned vehicle 100, a satellite device 210, a base station device 212, a weather radar device 220, a sensor device 230 deployed in the monitored area, and a base station device 232. Among satellite information acquired by the satellite device 210, weather radar information acquired by the weather radar device 220, and sensor information acquired by the sensor device 230, information regarding natural disasters is an example of the natural disaster data in the monitored area. Among the sensor information acquired by the sensor device 230, information regarding residents is an example of the residential area data in the monitored area. Among the information acquired by the unmanned vehicle 100, information regarding natural disasters is an example of the natural disaster data in the monitored area. Among the sensor information acquired by the unmanned vehicle 100, information regarding residents is an example of the residential area data in the monitored area.

The data storage system 300 is a storage unit that stores the video data, the natural disaster data, and the residential area data collected by the data collection system 200. The data storage system 300 is an example of a data storage device that stores the video data and the natural disaster data collected by the data collection system 200. The data storage system 300 includes, for example, a satellite information storage unit 310, a weather radar information storage unit 320, a sensor information storage unit 330, and an unmanned vehicle information storage unit 340. Each storage unit includes an information processing device and a storage device for data accumulation.

The data analysis device 400 is an analysis unit that extracts a feature amount of the video data, a feature amount of the natural disaster data, and a feature amount of the residential area data accumulated by the data storage system

300, and predicts a high-risk area where a risk of natural disaster occurrence is higher than in other areas. FIG. 2 is a diagram showing an example of an analysis database. The analysis database includes, for example, a location, a data type, a feature amount, a disaster risk, residential area data, deployment of the unmanned vehicle 100 during normal times, deployment of the unmanned vehicle 100 during disasters, and deployment of rescuers during disasters, which are registered in association with one another.

The residential area data indicates the presence or absence of a resident. The disaster risk is information predicted from the feature amount of the natural disaster data, and is information indicating whether or not the risk of disaster occurring is high. For example, areas near slopes and areas near rivers are predicted to be areas with high disaster risk. The deployment of the unmanned vehicle 100 during normal times is, for example, information indicating that the unmanned vehicle 100 for infrastructure inspection is deployed. The deployment information of the unmanned vehicle 100 during normal times may include information indicating a patrol route by the unmanned vehicle 100 for infrastructure inspection. The deployment during disasters is information for deploying the unmanned vehicle 100 during disasters. For example, the deployment of the unmanned vehicle 100 during disasters is information indicating that the unmanned vehicle 100 for monitoring a disaster, the unmanned vehicle 100 for supporting rescuers, and the unmanned vehicle 100 for searching for disaster victims are deployed in a residential area near a river during the disaster. For example, the deployment of the unmanned vehicle 100 during disasters is information indicating that the unmanned vehicle 100 for monitoring a disaster is deployed on a slope during the disaster. The deployment of rescuers is information for deploying rescuers during a disaster. For example, the deployment of rescuers during disasters is information indicating that rescuers will be deployed in a residential area near a river during a disaster. For example, the deployment information of rescuers during disasters is information indicating that there is no need to deploy rescuers on a slope during a disaster.

Figure 3:
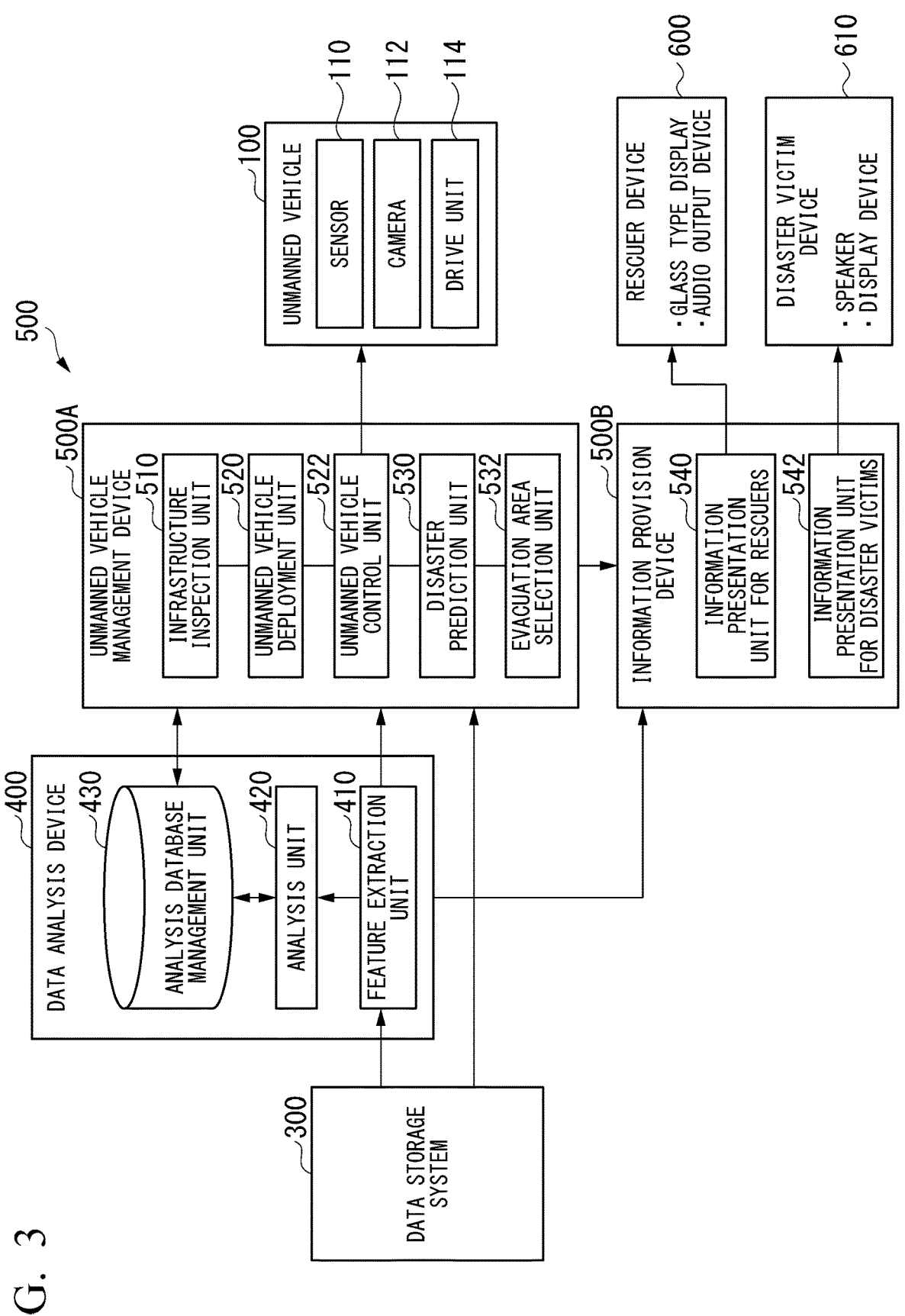
FIG. 3 is a block diagram showing an example of a data analysis device and a disaster prediction device according to the embodiment.

FIG. 3 is a block diagram showing an example of a data analysis device and a disaster prediction device according to the embodiment. The data analysis device 400 includes, for example, a feature extraction unit 410, an analysis unit 420, and an analysis database management unit 430. The feature extraction unit 410 extracts a feature amount of the video data, a feature amount of the natural disaster data, and a feature amount of the residential area data accumulated by the data storage system 300. For example, the feature extraction unit 410 extracts a feature of each of the video data, the natural disaster data, and the residential area data acquired during normal times. The feature extraction unit 410 extracts a feature of each of the video data, the natural disaster data, and the residential area data in real time during a disaster, and provides the extracted features to the disaster prediction device 500.

The analysis unit 420 determines an area with high disaster risk based on the features extracted by the feature extraction unit 410. The analysis unit 420 determines an area with high disaster risk among the predicted disaster areas, based on, for example, weather data, ground moisture data, ground change data, and the like. Specifically, the analysis unit 420 predicts a risk of a landslide occurring in a slope area, based on an amount of rainfall based on meteorological data, an amount of ground moisture on the slope, and ground changes. For example, the analysis unit 420 may determine an area where a resident is present in the monitored area, based on the video data and the information detected by the sensor device 230.

The disaster prediction device 500 includes, for example, an unmanned vehicle management device 500A and an information provision device 500B. The unmanned vehicle management device 500A is an information processing device that mainly deploys and controls the unmanned vehicles 100. The unmanned vehicle management device 500A includes, for example, an infrastructure inspection unit 510, an unmanned vehicle deployment unit 520, an unmanned vehicle control unit 522, a disaster prediction unit 530, and an evacuation area selection unit 532. The unmanned vehicle management device 500A is an example of an unmanned vehicle control device that determines deployment of the unmanned vehicles 100 and rescuers based on high-risk areas and disaster occurrence areas, and controls the unmanned vehicles 100 based on the deployment of the unmanned vehicles 100.

The infrastructure inspection unit 510 inspects deterioration of infrastructure equipment in the monitored area, based on the video data and the natural disaster data provided by the data storage system 300, and the feature amounts provided by the data analysis device 400. Examples of infrastructure equipment include river embankments and collapse prevention equipment on slopes.

The unmanned vehicle deployment unit 520 determines to deploy the unmanned vehicles 100 in a high-risk area where the disaster risk is high during normal times. The unmanned vehicle deployment unit 520 determines patrol locations and routes of the unmanned vehicles 100 during normal times. The unmanned vehicle control unit 522 drives the unmanned vehicles 100 in accordance with the deployment of the unmanned vehicles 100 and the patrol locations determined by the unmanned vehicle deployment unit 520 during normal times. As a result, the unmanned vehicle 100 can operate the drive unit 114 such as a motor to move to the deployed location, and provide the data storage system 300 with the natural disaster data acquired by a sensor 110 and the video data acquired by a camera 112.

The disaster prediction unit 530 understands and predicts a disaster occurrence area based on a comparison between the features of the video data and the natural disaster data during normal times and the features of the video data and the natural disaster data during disasters. The evacuation area selection unit 532 selects an evacuation area to which disaster victims can evacuate, based on a comparison between the features of the video data and the natural disaster data during normal times and the features of the video data and the natural disaster data during disasters. The unmanned vehicle deployment unit 520 may determine to deploy the unmanned vehicles 100 and rescuers in the disaster occurrence area predicted by the disaster prediction unit 530 and the evacuation area selected by the evacuation area selection unit 532. Thereby, the unmanned vehicle control unit 522 controls the unmanned vehicles 100 to move to the disaster occurrence area and the evacuation area.

The information provision device 500B is an information processing device for providing information acquired from the unmanned vehicle management device 500A. The information provision device 500B includes, for example, an information presentation unit for rescuers 540 and an information presentation unit for disaster victims 542. The information presentation unit for rescuers 540 transmits to the rescuer device 600 information to be provided to the rescuers. The rescuer device 600 is, for example, a head mounted display worn by a rescuer or a smartphone. The information to be provided to rescuers includes, for example, location information indicating deployment of rescuers, disaster conditions in the area where they have been deployed, information on evacuation routes, information indicating the presence or absence and location of disaster victims, and information on secondary disasters in the area where they have been deployed. The information presentation unit for disaster victims 542 transmits to the disaster victim device 610 information to be provided to the disaster victims. The disaster victim device 610 is, for example, a speaker and a display device installed in the monitored area. The information to be provided to the disaster victims is, for example, information on the conditions of the disaster occurrence area, whether or not evacuation is necessary, the location of the evacuation route, and secondary disasters, around the disaster victim device 610.

Note that in the unmanned vehicle management system of the embodiment, a plurality of functions are distributed such as the data storage system 300, the data analysis device 400, the unmanned vehicle management device 500A, and the information provision device 500B, but the embodiment is not limited to this. A plurality of functions may be aggregated into one device, or a plurality of functions may be distributed in a form different from that of the embodiment.

Figure 4:
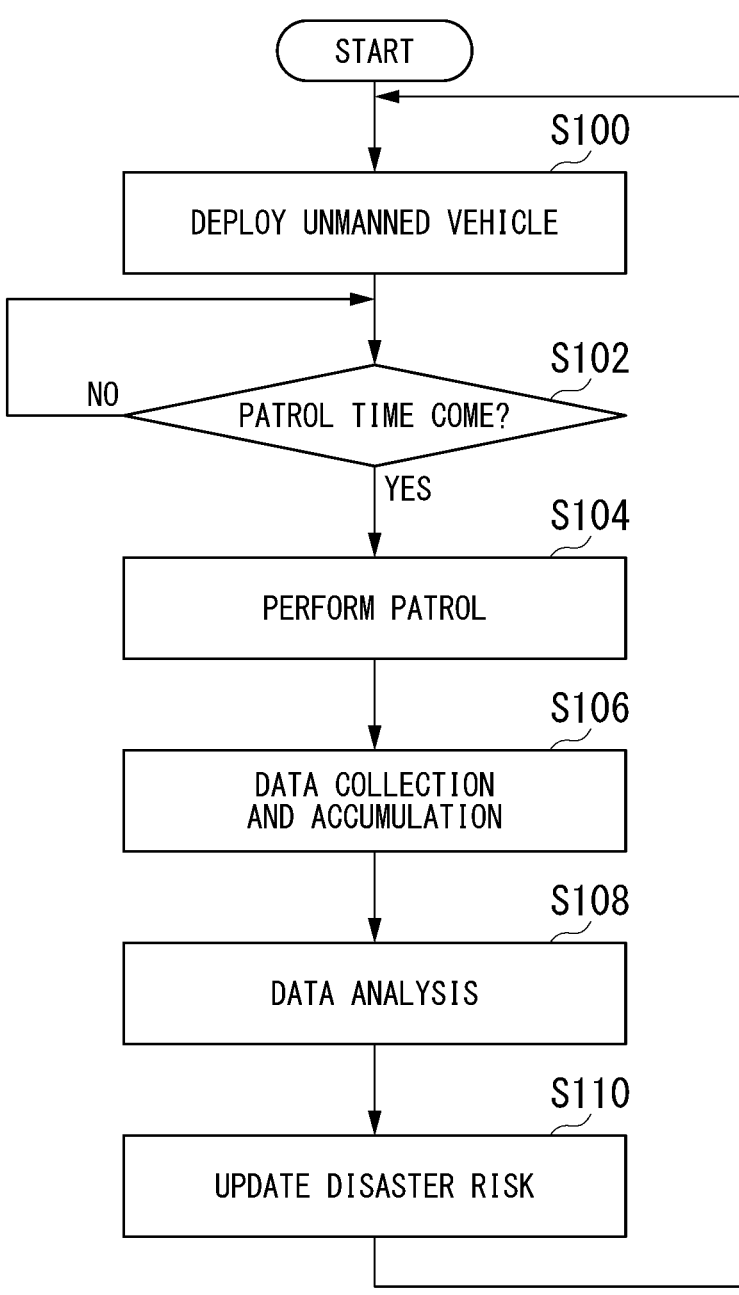
FIG. 4 is a flowchart showing an example of a normal operation in the unmanned vehicle management system according to the embodiment.
Figure 5:
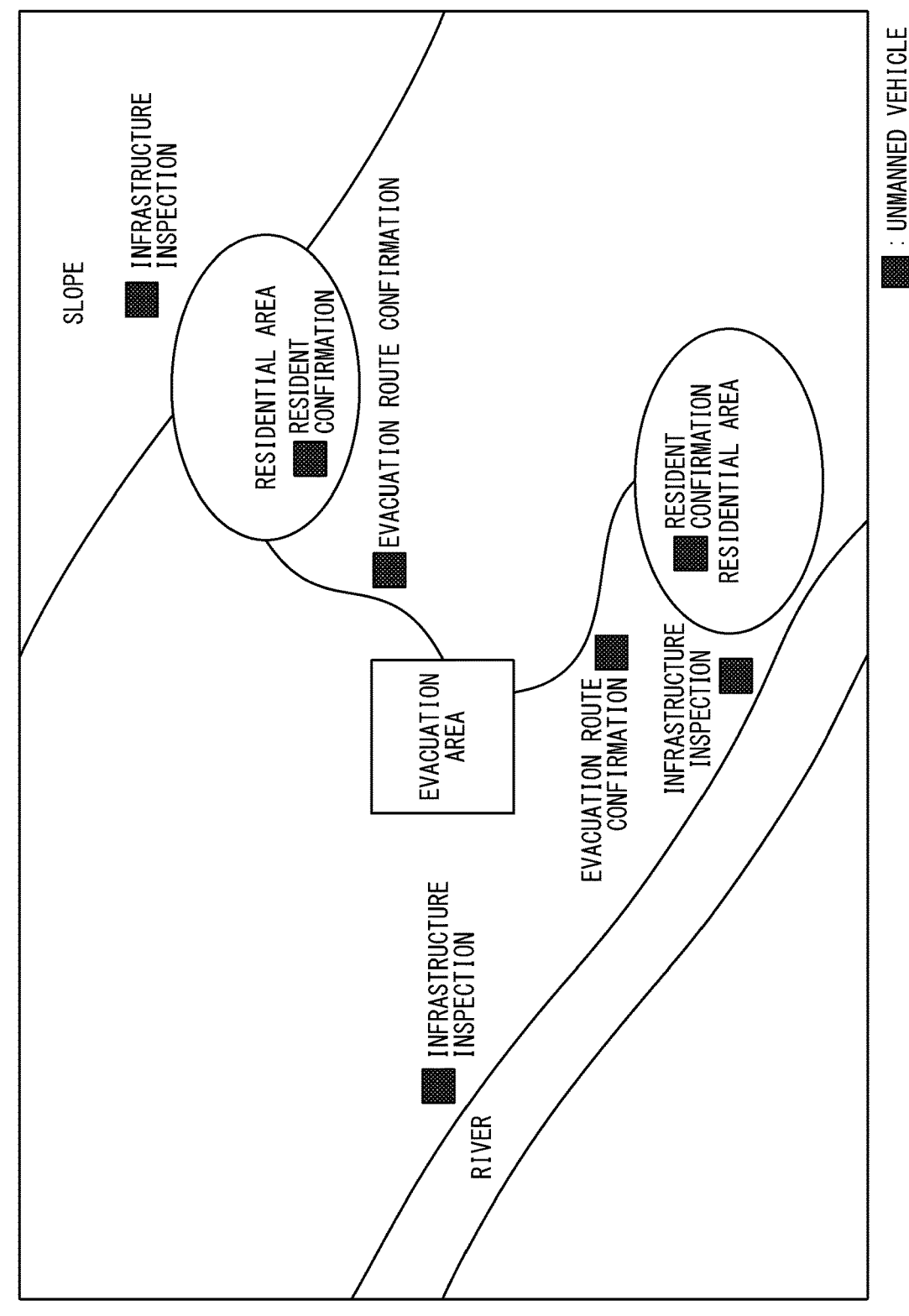
FIG. 5 is a diagram showing an example of deployment of unmanned vehicles during normal times according to the embodiment.

FIG. 4 is a flowchart showing an example of a normal operation in the unmanned vehicle management system according to the embodiment. The unmanned vehicle management system first refers to the analysis database and previously deploys the unmanned vehicle 100 in a high-risk area where the disaster risk is high (step S100). The unmanned vehicle management system waits until a time for the unmanned vehicle 100 to patrol the monitored area comes (step S102: NO). The patrol time may be, for example, a time that comes once a day. When the unmanned vehicle management system determines that the time for the unmanned vehicle 100 to patrol the monitored area has come (step S102: YES), the unmanned vehicle management system causes the unmanned vehicle 100 to perform a patrol (step S104). FIG. 5 is a diagram showing an example of deployment of the unmanned vehicles 100 during normal times according to the embodiment. For example, the unmanned vehicle management system can deploy the unmanned vehicles 100 for infrastructure inspection near rivers and slopes (squares in the figure), deploy the unmanned vehicles 100 for resident confirmation in residential areas, and deploy the unmanned vehicles 100 for evacuation route confirmation near the evacuation routes. As a result, the unmanned vehicle management system can collect data for infrastructure inspections. Further, the unmanned vehicle management system can collect information for identifying houses where people live during normal times.

The unmanned vehicle management system collects and accumulates the video data and the natural disaster data acquired by the unmanned vehicle 100 (step S106). Further, the unmanned vehicle management system also accumulates data collected from information sources other than the unmanned vehicle 100. The unmanned vehicle management system analyzes the collected video data, natural disaster data, and resident information (step S108), thereby updating the disaster risk (step S110). As a result, the unmanned vehicle management system can analyze the video data and the natural disaster data that can be used to inspect infrastructure equipment during normal times. As a result, the unmanned vehicle management system can support the work of inspecting the infrastructure equipment. Further, even if the disaster risk changes due to, for example, consecutive days of rain, the unmanned vehicle management system can reflect the change in the analysis database.

FIG. 6 is a flowchart showing an example of an operation during a disaster in the unmanned vehicle management system according to the embodiment. The unmanned vehicle management system determines whether a disaster has occurred (step S200). The unmanned vehicle management system may determine the occurrence of a disaster based on receiving a warning regarding a disaster from an external device, and may determine the occurrence of a disaster based on user operation. If no disaster has occurred (step S200: NO), the unmanned vehicle management system ends the processing, and if a disaster has occurred (step S200: YES), the unmanned vehicle management system performs the process in step S202 and the subsequent processes.

The unmanned vehicle management system refers to the analysis database and determines to deploy the unmanned vehicle 100 and a rescuer (step S202). The unmanned vehicle management system provides information for deploying rescuers to rescuer device 600 and the like. Thereby, the unmanned vehicle management system can control the unmanned vehicle 100 to move preferentially to a high-risk area. Further, the unmanned vehicle management system can determine to preferentially deploy the unmanned vehicle 100 and a rescuer in the residential area.

Figure 7:
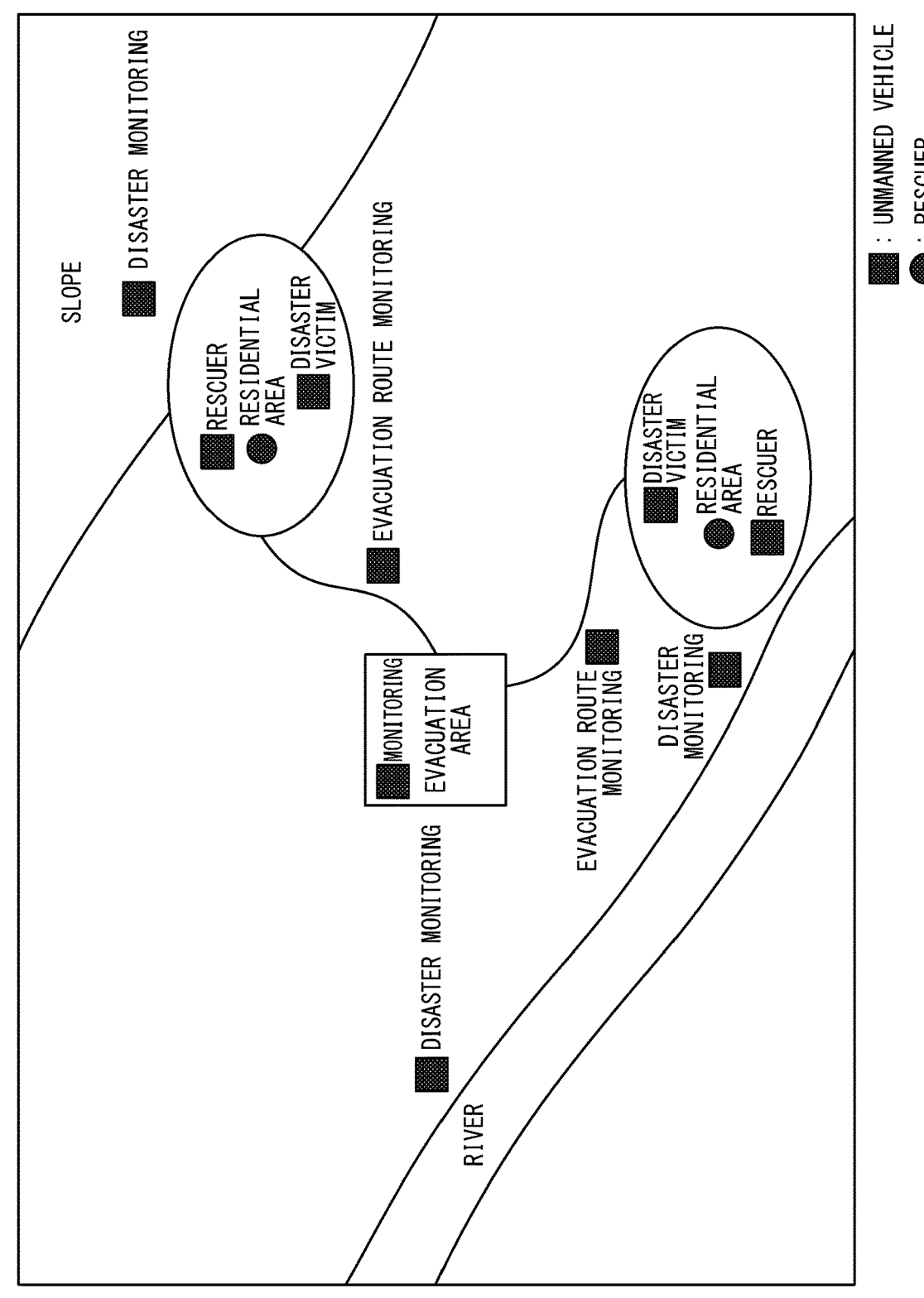
FIG. 7 is a diagram showing an example of deployment of unmanned vehicles during a disaster according to the embodiment.

FIG. 7 is a diagram showing an example of deployment of unmanned vehicles and rescuers during a disaster according to the embodiment. The unmanned vehicle management system deploys the unmanned vehicles 100 for disaster monitoring (squares in the figure), for example, near rivers and on slopes. As a result, the unmanned vehicle management system can collect natural disaster data to predict the spread of the disaster and secondary disasters in rivers and slopes. The unmanned vehicle management system deploys rescuers (circles in the figure), the unmanned vehicles 100 for disaster victims, and the unmanned vehicles 100 for rescuers in residential areas. As a result, the unmanned vehicle management system can collect natural disaster data to understand the disaster situation around the rescuers and the disaster victims, and data to understand the disaster victims who have not evacuated. The unmanned vehicle management system deploys the unmanned vehicles 100 for monitoring evacuation routes near the evacuation routes. As a result, the unmanned vehicle management system can collect natural disaster data to predict the spread of the disaster and secondary disasters along the evacuation routes. The unmanned vehicle management system deploys the unmanned vehicles 100 for monitoring in an evacuation areas. As a result, the unmanned vehicle management system can collect natural disaster data to predict disaster situations and secondary disasters in the evacuation area.

The unmanned vehicle deployment unit 520 may determine to deploy a plurality of unmanned vehicles in a high-risk area, a disaster occurrence area, or a residential area. The unmanned vehicle control unit 522 can acquire an amount of underground moisture using an optical sensor while the plurality of unmanned vehicles 100 deployed in each area move in parallel. As a result, the unmanned vehicle management system can quickly acquire video data regarding disaster situations and provide them to the data storage system 300, the data analysis device 400, and the disaster prediction device 500.

The data storage system 300 may accumulate information indicating rescue areas where disaster victims have been rescued in the past. As a result, the unmanned vehicle management system can determine to preferentially deploy the unmanned vehicles 100 and rescuers in the rescue areas in step S202.

The unmanned vehicle management system collects and accumulates the video data and the natural disaster data acquired by the unmanned vehicles 100 (step S204). The unmanned vehicle management system understands, updates, and predicts a disaster occurrence area based on the collected video data and natural disaster data (step S206). The unmanned vehicle management system selects an evacuation area and an evacuation route based on the latest disaster situation and the predicted disaster (step S208). The unmanned vehicle management system provides the rescuers and the disaster victims with information regarding the latest disaster situation, the predicted disaster, the evacuation area, and the evacuation route (step S210).

Figure 8:
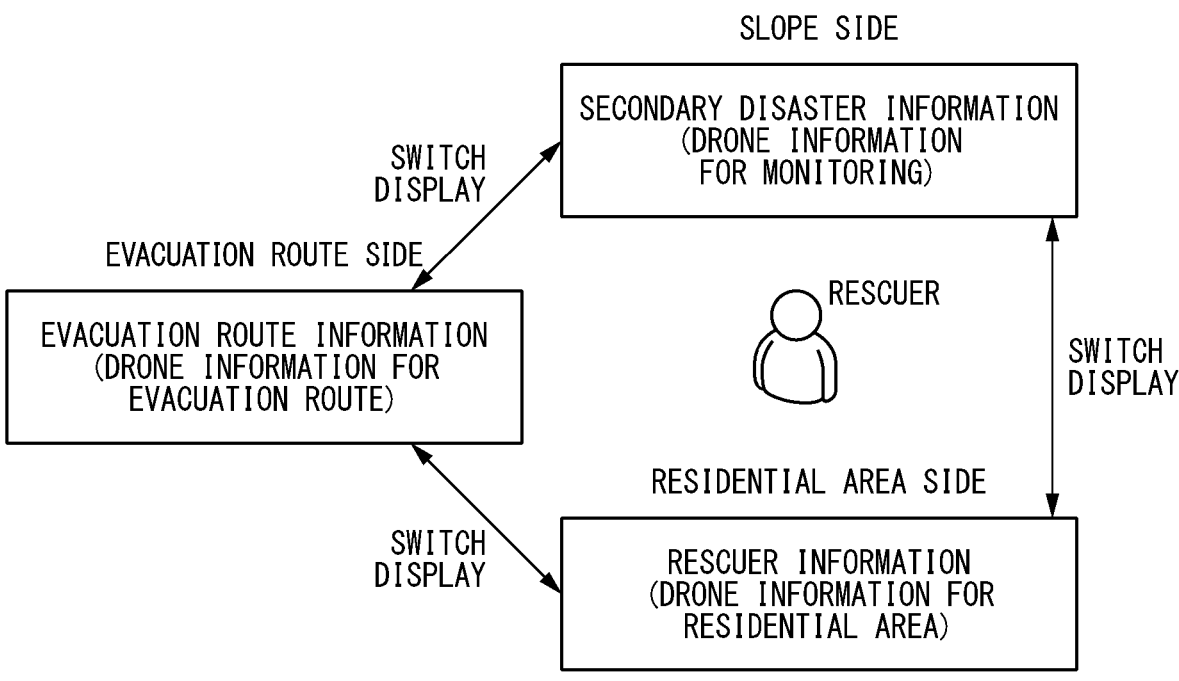
FIG. 8 is a diagram showing an example of information provided to rescuers according to the embodiment.

FIG. 8 is a diagram showing an example of information provided to rescuers according to the embodiment. The unmanned vehicle management system may provide the rescuer device 600 with disaster situation information near the rescuer, secondary disaster information, and evacuation route information. The disaster situation information near the rescuer includes information such as the latest disaster situation in the area where the rescuer is present and the presence or absence of disaster victims. The disaster situation information near the rescuer may be information based on the video data and the natural disaster data acquired by the unmanned vehicle 100 deployed in a residential area, for example. The secondary disaster information includes information predicting secondary damage to the area where the rescuer is present. The secondary disaster information may be information based on the video data and the natural disaster data acquired by the unmanned vehicle 100 deployed on a slope near the rescuer, for example. The evacuation route information includes information indicating the disaster situation along an evacuation route from the area where the rescuer is present to the evacuation area. The evacuation route information may be information based on the video data and the natural disaster data acquired by the unmanned vehicles 100 deployed in the evacuation route and the evacuation area, for example. The rescuer device 600 may switch the information displayed superimposed on the video displayed on the head mounted display or the scenery the rescuer is viewing, based on the direction in which the rescuer is looking. For example, when a rescuer is searching a residential area, the rescuer device 600 displays information based on the video data acquired by a first unmanned vehicle 100 deployed at the residential area. When a slope is viewed, the rescuer device 600 displays information based on the video data acquired by a second unmanned vehicle deployed on the slope. When an evacuation route is viewed, the rescuer device 600 displays information based on the video data acquired by a third unmanned vehicle deployed on the evacuation route.

The unmanned vehicle management system determines whether or not to end the disaster activity, and if the disaster activity is not to end, repeats the processes from step S202 to step S210 (step S212: NO). When ending the disaster activity, the unmanned vehicle management system provides information instructing rescuers to stop the disaster activity or evacuate from the disaster area, and ends the processing (step S212: YES).

As a result, the unmanned vehicle management system can preferentially deploy the unmanned vehicles 100 and rescuers in a high-risk area, a disaster predicted area, and a residential area during a disaster. Further, the unmanned vehicle management system can collect video data and natural disaster data to understand and predict a disaster, and select an evacuation areas and an evacuation route. As a result, according to the unmanned vehicle management system, the deployment of the rescuers and the unmanned vehicles 100 can be changed based on the results of understanding and predicting a disaster and selecting an evacuation area and an evacuation route. Based on information collected from residential areas during a disaster, it is possible to determine to preferentially deploy the unmanned vehicles 100 and rescuers in an area where disaster victims are present in the disaster occurrence area. Further, according to the unmanned vehicle management system, it is possible to make decisions such as continuing or stopping disaster activities and evacuating disaster victims based on the understanding and prediction of disasters. As a result, according to the unmanned vehicle management system, secondary disasters can be avoided.

Figure 9:
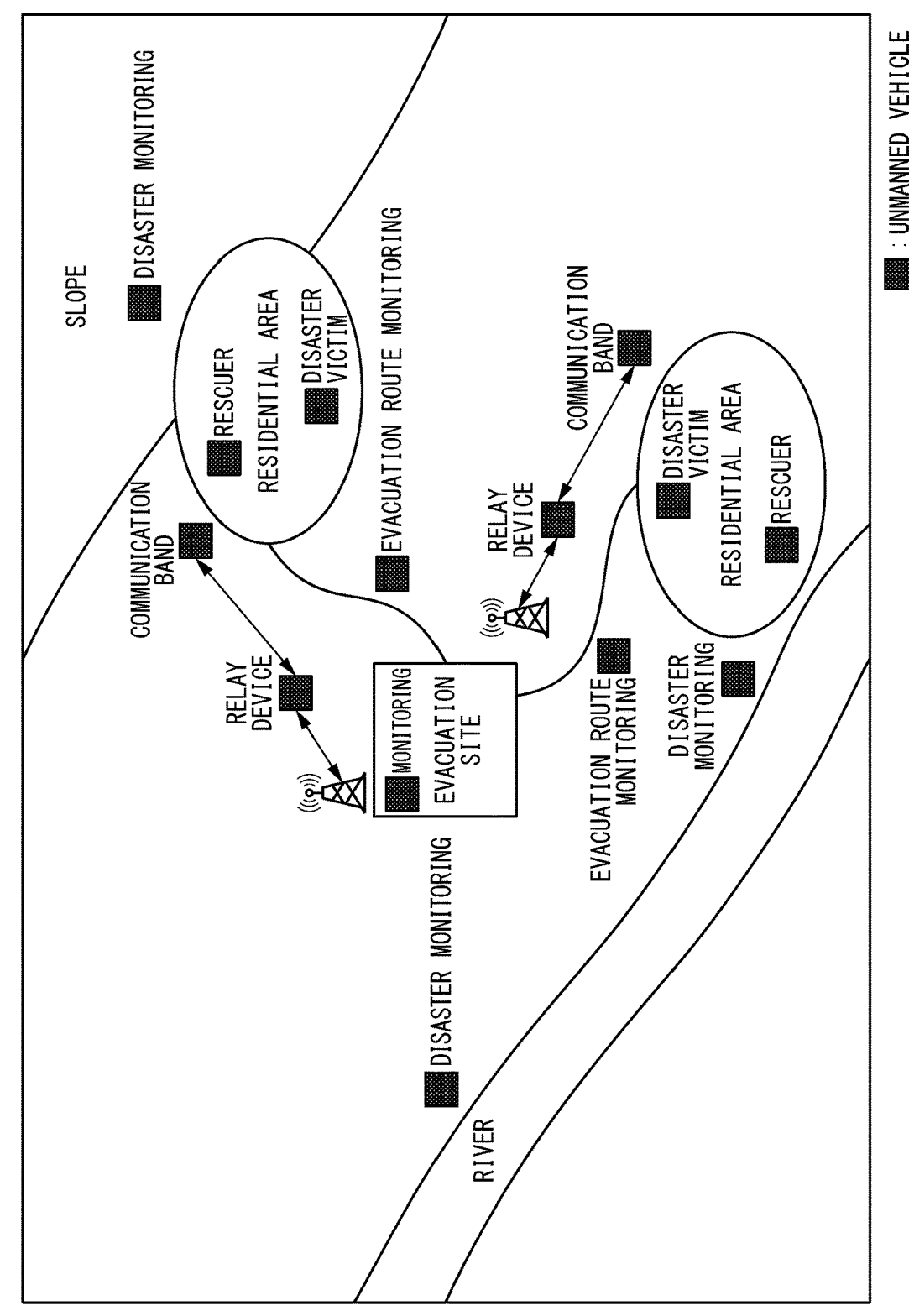
FIG. 9 is a diagram showing another example of deployment of unmanned vehicles during a disaster according to the embodiment.

FIG. 9 is a diagram showing another example of deployment of unmanned vehicles during a disaster according to the embodiment. In addition to deploying the rescuers and the unmanned vehicles 100 as described with reference to FIG. 7, the unmanned vehicle management system may determine to deploy a fourth unmanned vehicle 100 with a relay function that relays signals from a fixedly installed base station and a fourth unmanned vehicle 100 for securing a communication band. As a result, the unmanned vehicle management system can increase communication resources for collecting video data and natural disaster data. As a result, the unmanned vehicle 100 for disaster victims can transmit the video data with low latency to the data storage system 300, the data analysis device 400, and the disaster prediction device 500 via the unmanned vehicle 100 which has the relay function and the communication band securing function.

As described above, according to the unmanned vehicle management system of the embodiment, it is possible to: collect and store the video data acquired by the unmanned vehicle 100 and natural disaster data related to natural disasters from information sources; extract a feature amount of the video data and a feature amount of the natural disaster data, and predict a high-risk area where a risk of natural disaster occurrence is higher than in other areas; compare the video data and the natural disaster data collected during a disaster with the video data and the natural disaster data collected during normal times, and predict a disaster occurrence area where a disaster will occur; and determine deployment of the unmanned vehicle 100 and a rescuer based on the high-risk area and the disaster occurrence area. Thereby, according to the unmanned vehicle management system, unmanned vehicles 100 and rescuers can be appropriately deployed during a disaster. As a result, the unmanned vehicle management system enables detailed investigation of infrastructure that is difficult to detect by remote sensing during normal times, and can further reduce the cost required for regular manual inspections of infrastructure. Further, according to the unmanned vehicle management system, during a disaster, even in situations where there are few rescuers involved in rescue operation, it is possible to quickly start searching and rescuing victims and shorten the operation time.

Although the embodiments of the present disclosure have been described above in detail with reference to the drawings, the specific configuration is not limited to the above-described embodiments, and includes designs within the scope of the gist of the present disclosure.

Description of Symbols

100 . . . unmanned vehicle, 110 . . . sensor, 112 . . . camera, 114 . . . drive unit, 200 . . . data collection system, 210 . . .

satellite device, 212 . . . base station device, 220 . . . weather radar device, 230 . . . sensor device, 232 . . . base station device, 300 . . . data storage system, 310 . . . satellite information storage unit, 320 . . . weather radar information storage unit, 330 . . . sensor information storage unit, 340 . . . unmanned vehicle information storage unit, 400 . . . data analysis device, 410 . . . feature extraction unit, 420 . . . analysis unit, 430 . . . analysis database management unit, 500 . . . disaster prediction device, 500A . . . unmanned vehicle management device, 500b . . . information provision device, 510 . . . infrastructure inspection unit, 520 . . . unmanned vehicle deployment unit, 522 . . . unmanned vehicle control unit, 530 . . . disaster prediction unit, 532 . . . evacuation area selection unit, 540 . . . information presentation unit for rescuers, 542 . . . information presentation unit for disaster victims, 600 . . . rescuer device, 610 . . . disaster victim device

The invention claimed is:

1. An unmanned vehicle management system comprising:
a data collection device configured to collect video data acquired by an unmanned vehicle and natural disaster data in a monitored area acquired by information sources including at least one of a satellite device, a weather radar device, and a sensor device deployed in the monitored area;
a data storage device configured to store the video data and the natural disaster data;
an data analysis device configured to extract a feature value of the video data and extract a feature value of the natural disaster data, and predict a high-risk area where a risk of natural disaster occurrence is higher than in other areas based on the extracted feature value of the video data and the extracted feature value of the natural disaster data;
a disaster prediction device configured to compare the video data and the natural disaster data collected during a disaster with the video data and the natural disaster data collected during normal times, and predict a disaster occurrence area where a disaster might occur; and
an unmanned vehicle control device configured to determine deployment of the unmanned vehicle and a rescuer based on the high-risk area and the disaster occurrence area.

2. The unmanned vehicle management system according to claim 1, wherein
the unmanned vehicle control device is configured to, when a disaster occurs, determine to deploy the unmanned vehicle and the rescuer in the high-risk area and the disaster occurrence area.

3. The unmanned vehicle management system according to claim 1, wherein
the data collection device is configured to collect residential area data regarding an area where a resident is present,
the data storage device is configured to store the residential area data, and
the unmanned vehicle control device is configured to, when a disaster occurs, determine to deploy the unmanned vehicle and the rescuer in the disaster occurrence area where the resident is present.

4. The unmanned vehicle management system according to claim 1, wherein
the data storage device is configured to store information indicating a rescue area where a disaster victim has been rescued in the past, and

the unmanned vehicle control device is configured to determine to preferentially deploy the unmanned vehicle and the rescuer in the rescue area.

5. The unmanned vehicle management system according to claim 1, wherein the unmanned vehicle control device is configured to determine to deploy a first unmanned vehicle in an area where the rescuer has been deployed, deploy a second unmanned vehicle on an evacuation route from the area where the rescuer has been deployed to an evacuation site, and p2 deploy a third unmanned vehicle in an area where a secondary disaster is expected to occur around the area where the rescuer has been deployed, and the disaster prediction device is configured to predict an occurrence of a disaster based on video data acquired by the first unmanned vehicle, predict an occurrence of a disaster on the evacuation route based on video data acquired by the second unmanned vehicle, and predict an occurrence of a secondary disaster based on video data acquired by the third unmanned vehicle.

6. The unmanned vehicle management system according to claim 5, comprising:

an information provision device configured to be worn by the rescuer, wherein the information provision device is configured to, based on a direction in which the rescuer is looking, switch information based on the video data acquired by the first unmanned vehicle, information based on the video data acquired by the second unmanned vehicle, and information based on the video data acquired by the third unmanned vehicle, and superimpose the switched information onto a video or scenery.

7. The unmanned vehicle management system according to claim 1, wherein the unmanned vehicle control device is configured to determine to deploy a plurality of unmanned vehicles in each of the high-risk area and the disaster occurrence area, the plurality of unmanned vehicles are configured to acquire an amount of moisture in a ground using an optical sensor, while moving in parallel.

8. The unmanned vehicle management system according to claim 1, wherein the unmanned vehicle control device is configured to determine to deploy in the high-risk area, the disaster occurrence area, or a residential area where a resident is present, a fourth unmanned vehicle having a relay function to relay a signal from a base station fixedly installed, and the unmanned vehicle deployed in the high-risk area, the disaster occurrence area, or the residential area is configured to transmit video data to the base station via the fourth unmanned vehicle.

9. An unmanned vehicle management method comprising:

collecting video data acquired by an unmanned vehicle and natural disaster data in a monitored area acquired by information sources including at least one of a satellite device, a weather radar device, and a sensor device deployed in the monitored area;

storing the video data and the natural disaster data;

extracting a feature value of the video data and extracting a feature value of the natural disaster data, and predicting a high-risk area where a risk of natural disaster occurrence is higher than in other areas based on the extracted feature value of the video data and the extracted feature value of the natural disaster data;

comparing the video data and the natural disaster data collected during a disaster with the video data and the natural disaster data collected during normal times, and predicting a disaster occurrence area where a disaster might occur; and determining deployment of the unmanned vehicle and a rescuer based on the high-risk area and the disaster occurrence area.

10. The unmanned vehicle management method according to claim 9, further comprising:

when a disaster occurs, determining to deploy the unmanned vehicle and the rescuer in the high-risk area and the disaster occurrence area.

11. The unmanned vehicle management method according to claim 9, further comprising:

collecting residential area data regarding an area where a resident is present;

storing the residential area data; and when a disaster occurs, determining to deploy the unmanned vehicle and the rescuer in the disaster occurrence area where the resident is present.

12. The unmanned vehicle management method according to claim 9, further comprising:

storing information indicating a rescue area where a disaster victim has been rescued in the past; and determining to deploy the unmanned vehicle and the rescuer in the rescue area.

13. The unmanned vehicle management method according to claim 9, further comprising:

deploying a first unmanned vehicle in an area where the rescuer has been deployed;

deploying a second unmanned vehicle on an evacuation route from the area where the rescuer has been deployed to an evacuation site;

deploying a third unmanned vehicle in an area where a secondary disaster is expected to occur around the area where the rescuer has been deployed;

predicting an occurrence of a disaster based on video data acquired by the first unmanned vehicle;

predicting an occurrence of a disaster on the evacuation route based on video data acquired by the second unmanned vehicle; and predicting an occurrence of a secondary disaster based on video data acquired by the third unmanned vehicle.

14. The unmanned vehicle management method according to claim 13, further comprising:

based on a direction in which the rescuer is looking, switching information based on the video data acquired by the first unmanned vehicle, information based on the video data acquired by the second unmanned vehicle, and information based on the video data acquired by the third unmanned vehicle, and superimposing the switched information onto a video or scenery.

15. The unmanned vehicle management method according to claim 9, further comprising:

determining to deploy a plurality of unmanned vehicles in each of the high-risk area and the disaster occurrence area; and acquiring, by the plurality of unmanned vehicles, an amount of moisture in a ground using an optical sensor, while the plurality of unmanned vehicle are moving in parallel.

16. The unmanned vehicle management method according to claim 9, further comprising:

determining to deploy in the high-risk area, the disaster occurrence area, or a residential area where a resident is present, a fourth unmanned vehicle having a relay function to relay a signal from a base station fixedly installed, and transmitting video data from the unmanned vehicle deployed in the high-risk area, the disaster occurrence area, or the residential area to the base station via the fourth unmanned vehicle.

17. An unmanned vehicle management system comprising:

an data analysis device configured to extract a feature value of video data acquired by an unmanned vehicle and a feature value of natural disaster data in a monitored area acquired by information sources including at least one of a satellite device, a weather radar device, and a sensor device deployed in the monitored area, and predict a high-risk area where a risk of disaster occurrence is higher than in other areas based on the extracted feature value of the video data and the extracted feature value of the natural disaster data;

a disaster prediction device configured to compare the natural disaster data and the video data collected during a disaster with the natural disaster data and the video data collected during normal times, and predict a disaster occurrence area where a disaster might occur; and an unmanned vehicle control device configured to determine deployment of an unmanned vehicle and a rescuer based on of the high-risk area and the disaster occurrence area.

\*    \*    \*    \*    \*